United States Patent
Beaurepaire

(10) Patent No.: US 9,909,878 B2
(45) Date of Patent: Mar. 6, 2018

(54) METHOD AND APPARATUS FOR TRIGGERING CONVEYANCE OF GUIDANCE INFORMATION

(75) Inventor: Jerome Beaurepaire, Berlin (DE)

(73) Assignee: HERE Global B.V., Veldhoven (NL)

( * ) Notice: Subject to any disclaimer, the term of this patent is extended or adjusted under 35 U.S.C. 154(b) by 1015 days.

(21) Appl. No.: 13/412,207

(22) Filed: Mar. 5, 2012

(65) Prior Publication Data
US 2013/0231857 A1 Sep. 5, 2013

(51) Int. Cl.
*G01C 21/20* (2006.01)

(52) U.S. Cl.
CPC .................. *G01C 21/20* (2013.01)

(58) Field of Classification Search
CPC ........... G08G 1/096861; G08G 1/0969; G08G 1/096827; G08G 1/096872; G01C 21/3629
USPC ..... 701/428, 1, 117, 25, 412, 430, 431, 472, 701/9; 704/246, 275; 340/686.6, 995.1
See application file for complete search history.

(56) References Cited

U.S. PATENT DOCUMENTS

| | | |
|---|---|---|
| 5,177,685 A | 1/1993 | Davis et al. |
| 6,078,865 A | 6/2000 | Koyanagi |
| 7,831,433 B1 | 11/2010 | Belvin et al. |
| 8,140,197 B2 * | 3/2012 | Lapidot et al. .................. 701/9 |
| 2005/0177305 A1 * | 8/2005 | Han .............................. 701/211 |
| 2007/0021910 A1 * | 1/2007 | Iwami et al. .................. 701/210 |
| 2008/0262717 A1 | 10/2008 | Ettinger |
| 2012/0109753 A1 * | 5/2012 | Kennewick et al. ....... 705/14.58 |
| 2012/0179369 A1 * | 7/2012 | Lapidot et al. ............... 701/468 |
| 2012/0221244 A1 * | 8/2012 | Georgy et al. ............... 701/472 |
| 2013/0211710 A1 * | 8/2013 | Kennewick et al. ......... 701/419 |
| 2013/0304367 A1 * | 11/2013 | Stehle et al. .................. 701/117 |

FOREIGN PATENT DOCUMENTS

| | | |
|---|---|---|
| EP | 1378724 A1 | 7/2004 |
| WO | WO 2005098360 A1 | 10/2005 |

* cited by examiner

*Primary Examiner* — Jelani A Smith
(74) *Attorney, Agent, or Firm* — Ditthavong & Steiner, P.C.

(57) ABSTRACT

An approach for triggering the conveyance of guidance information based on the current line-of-sight of the user is described. A guidance platform processes and/or facilitates a processing of sensor information associated with a device, a user of the device, or a combination thereof to determine (a) line-of-sight information to at least one navigation element, (b) one or more user behavior patterns, or (c) a combination thereof. The guidance platform then determines a timing, a frequency, or a combination thereof of at least one presentation of guidance information based, at least in part, on the line-of-sight information.

18 Claims, 13 Drawing Sheets

100

320

312

400

400

METHOD AND APPARATUS FOR TRIGGERING CONVEYANCE OF GUIDANCE INFORMATION

BACKGROUND

Service providers and device manufacturers (e.g., wireless, cellular, etc.) are continually challenged to deliver value and convenience to consumers by, for example, providing compelling route planning applications and services. For example, device users often rely upon global positioning system (GPS) technology and complimentary mapping applications to plan routes and determine optimal travel paths. Certain mapping applications also provide voice-based or visual guidance information for enabling a determined route to be conveyed to the user as they travel.

Typically, guidance information is triggered for execution by the mapping application based on a relative distance between the mobile device and the destination. As a static set of information, the guidance does not vary with changing conditions or factors associated with the user. For example, the same guidance information is conveyed even when the user stops, alters their orientation, is contemplating a different direction, takes a detour, etc. Furthermore, the guidance information does not account for the current visual perspective of the user or the presence of specific elements within the user's line-of-sight. Unfortunately, there is currently no convenient means of triggering the conveyance of guidance information based on the current behavior or visual perspective of the user.

Some Example Embodiments

Therefore, there is a need for an approach for triggering the conveyance of guidance information based on the current line-of-sight of the user.

According to one embodiment, a method comprises processing and/or facilitating a processing of sensor information associated with a device, a user of the device, or a combination thereof to determine line-of-sight information to at least one navigation element, one or more user behavior patterns, or a combination thereof. The method also comprises determining a timing, a frequency, or a combination thereof of at least one presentation of guidance information based, at least in part, on the line-of-sight information.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of sensor information associated with a device, a user of the device, or a combination thereof to determine line-of-sight information to at least one navigation element, one or more user behavior patterns, or a combination thereof. The apparatus is also caused to determine a timing, a frequency, or a combination thereof of at least one presentation of guidance information based, at least in part, on the line-of-sight information.

According to another embodiment, a computer-readable storage medium carries one or more sequences of one or more instructions which, when executed by one or more processors, cause, at least in part, an apparatus to process and/or facilitate a processing of sensor information associated with a device, a user of the device, or a combination thereof to determine line-of-sight information to at least one navigation element, one or more user behavior patterns, or a combination thereof. The apparatus is also caused to determine a timing, a frequency, or a combination thereof of at least one presentation of guidance information based, at least in part, on the line-of-sight information.

According to another embodiment, an apparatus comprises means for processing and/or facilitating a processing of sensor information associated with a device, a user of the device, or a combination thereof to determine line-of-sight information to at least one navigation element, one or more user behavior patterns, or a combination thereof. The apparatus also comprises means for determining a timing, a frequency, or a combination thereof of at least one presentation of guidance information based, at least in part, on the line-of-sight information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for triggering the conveyance of guidance information based on the current behavior of the user are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
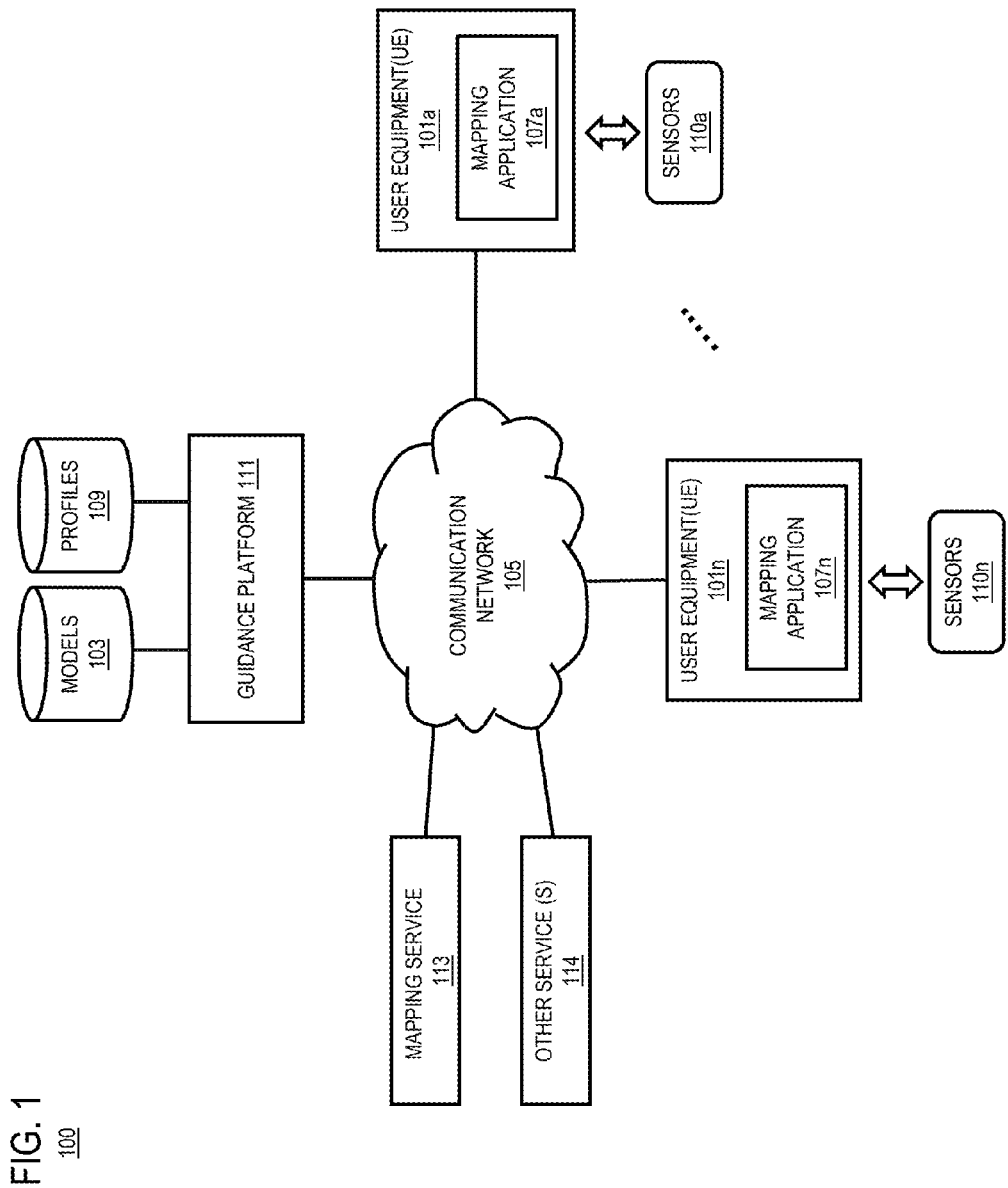
FIG. 1 is a diagram of a system capable of triggering the conveyance of guidance information based on the current line-of-sight of the user, according to one embodiment.

FIG. 1 is a diagram of a system capable of triggering the conveyance of guidance information based on the current line-of-sight of the user, according to one embodiment. For the purpose of illustration, guidance information refers to any verbal or visual instructions, commands, queues, prompts or the like to be rendered by a device of a user. In the context of a routing application, the guidance information may include the expression of street names, travel directions, travel times and distances, details regarding points-of-interest (POIs), and details regarding other navigation elements. The guidance information may be voice-based, for conveyance via an audio and/or speaker system of the device. Alternatively, or in addition to voice-based rendering, the guidance information may be rendered visually to the display of a device. Although various embodiments are described with respect to the use of guidance information in connection with mapping applications 107a-107n and/or mapping services 113, it is contemplated the approach described may be used with other user interactive applications and services, including online help systems, purchase transaction systems, and the like.

In the case of mapping applications and services, guidance information is typically triggered for execution based on a relative distance between the mobile device and the destination. Hence, as the user approaches a specific waypoint determined as part of the route to the destination, the relative distance serves to trigger execution (e.g., playback) of the corresponding instruction and/or command. Because the guidance information is generated in connection with the determined route information, it is static in nature. Consequently, the guidance conveyed does not account for specific changes in the behavior of the user such as a change in activity, view of the environment, movement, etc.

Unfortunately, behavioral patterns exhibited by the user that require an update to the routing or guidance information do not occur in conventional guidance information systems. Furthermore, current guidance information systems do not express instructions and/or commands in a more user-friendly, familiar manner. Instead, the language used to express an instruction or command is general rather than expressing familiarity or awareness of the various navigation elements within the current line-of-sight of the user.

To address this problem, a system 100 of FIG. 1 introduces the capability to trigger execution of relevant guidance information based on a current line-of-sight of a user, one or more behavior patterns exhibited by the user, or a combination thereof. For the purpose of illustration, relevant guidance information includes any representation of instructions or commands that are based on visual cues, inferences and references to objects within present view of the user. Also, relevant guidance information may include that which is of most use to a user in describing a course of action for the user relative to their current environment, location, needs, etc. By way of example, the relevant guidance information may include the use of words, phrases, expressions, etc., that indicate a familiarity of the application or service (that called for the guidance information) with the user's present environment. Under this scenario, in the case of a mapping application, an instruction to "Turn right behind the white car" specifies an element within current view of the user rather than "Turn right at Neal Street."

By way of example, a line-of-sight of a user or device pertains to a field-of-view, range, direction or a combination thereof of visual perception of the user as they encounter various elements with their environment. The range may correspond to a relative three-dimensional perspective of the user while the direction corresponds to the general angle, tilt or direction (line) exercised by the user and/or the user equipment (UE) 101a-101n in viewing these elements. For the purpose of illustration, the navigation elements may include, for example, people, objects or a group thereof. In addition, the people and/or objects within the environment may interact within the environment and with one another statically or dynamically. Under this scenario, the line-of-sight of a user for viewing one or more navigation elements within their environment is impacted by various visibility factors. These factors include, for example, weather conditions, lighting conditions, physical obstructions, etc. Similarly, the line-of-sight of a device capable of gathering image data pertains to the current direction of a camera/imaging sensor, a visual perspective of the camera/imaging sensor, or a combination thereof. The line-of-sight of a camera varies depending on factors such as the current location, depth, orientation, position, tilt, zoom and other characteristics of the device.

In certain embodiments, the guidance platform 111 is configured to perform one or more of the following: (1) determine the gathering of sensor information related to the user, a mobile device of the user, or a combination thereof; (2) identify a behavioral condition or pattern of the user based on the gathered sensor information; (3) identify one or more navigation elements (e.g., points-of-interest) are within a line-of-sight of the user based on the sensor information; (4) determine a correlation between the one or more navigation elements and/or the location of the user and an expected time another navigation is to be within view of the user; and (5) update and/or generate guidance information pertaining to the user based on the exhibited behavior, the presence of the navigation elements within the user's line-of-sight, the expected time, or a combination thereof. As will be discussed more fully later on, the guidance platform 111 is configured to determine line-of-sight information relating the user and/or UE 101. Line-of-sight information includes any data for indicating the presence and/or characteristics of various navigation elements within the user's line-of-sight. Relevant guidance information is then triggered for execution—i.e., visual and/or verbal conveyance—based on a determined or predicted line-of-sight information.

In certain embodiments, the guidance platform 111 operates in connection with a mapping application 107a-107n and/or mapping service 113 to convey routing information. The mapping application 107a-107n may be a dedicated application or a browser application for use by UE 101a-101n. In addition, the platform 111 interacts with the user equipment (UE) 101a-101n that accesses the mapping application 107a-107n and/or service 113 via a communication network 105. The routing information may include, for example, directions, maps, images representative of various points-of-interest, waypoints, coordinates and other navigation elements. The routing information may also include, based on a user selected level of granularity, an image or map representative of a general area, region or location. As such, the guidance platform 111 provides the user with guidance information based on or related to the routing information. The guidance platform 111 enables the guidance information to be dynamically updated and/or generated by the platform 111 to express the routing information based on a determined perspective (line-of-sight) of the user, behavioral patterns of the user, or both relative to the user's current location.

In certain embodiments, the guidance information may be adapted to accommodate different user navigation modalities, including a tourist modality, local resident modality, walking modality, vehicular travel modality, bicycle travel modality, etc. By way of this approach, the guidance platform 111 generates guidance information appropriate for the corresponding modality. It is noted the modality may be specified by the user or alternatively detected based on collected sensor information.

In certain embodiments, user behavioral patterns are determined from the gathering and subsequent analysis of data provided by one or more sensors 110 of user equipment (UE) 101a-101n (i.e., a mobile device). The sensors 110 include, for example, a gyroscope, accelerometer, global positioning sensor, temporal sensor, motion sensor, audio recorder, temperature sensor, network detection sensor and the like. In addition, an imaging sensor/camera may also be employed for capturing image data regarding the user and/or an environment the user traverses. It is noted that the guidance platform 111 may receive sensor information from one or more UE 101.

The guidance platform 111 analyzes the data gathered by said sensors 110 to determine a relative speed, orientation, activity, location, number of start/stop (hesitation) occurrences, number of missed turns, number of improper orientations of the user, motion, or environmental condition associated with the user. In the context of a mapping application 107 or service 113, the sensor information reveals these factors associated with the user as they travel towards a destination. It is noted that the camera/imaging sensor of UE 101a-101n may also be employed by the guidance platform 111 to reveal the current line-of-sight of the user/UE 101.

By way of example, a motion, location, tilt and positioning sensor of a UE 101a may be activated to determine intermittent starting and stopping (hesitation) of the user. Based on this behavior, the guidance platform 111 triggers the following voice command: "Just turn around, then continue straight ahead for 200 meters" or "Now turn into Oxford Street." As another example, the position and/or orientation of the user may be determined to be away from the general direction of a specified route. Under this scenario, the guidance platform 111 may decide not to convey guidance information or prompt the user to turn in the direction of the target destination. A voice command triggered may include, for example: "Turn 45 degrees on your right and you should see ABC Coffee Shop. Follow this street for 200 meters."

In one embodiment, the guidance platform 111 may enable post-processing of the user's missed turns, hesitation points, or other behavior information relative to a given location. By way of this approach, the guidance platform 111 uses this information to determine which navigation elements are regularly overseen by the user or deemed misleading to the user. Resultantly, the messaging templates and corresponding sequencing/prioritization scheme may be modified accordingly to exclude these elements or include alternate elements corresponding to the line-of-sight information that is more favorable to the user. In addition, the behavior information may be conveyed to the guidance platform 111 for post-processing anonymously; to improve the effectiveness of triggering of guidance information relative to locations/navigation elements where multiple people expressed hesitation, misdirection, etc.

A change in user activity can be also be detected and accounted for the by guidance platform 111. For example, when a user enters a store as they engage the travel path to make a purchase via a purchasing application of their UE 101, this activity information is relayed to the guidance platform 111 in addition to current position and location information. Resultantly, the guidance platform 111 triggers the following voice command once the purchase transaction is completed: "Upon exit, turn left and walk towards Craig Street." Under this scenario, the voice command is only triggered upon completion of the purchase transaction or only as the user is determined to be nearing the closest exit for resuming the route. The instruction may also be triggered based on environmental conditions—i.e., the guidance platform 111 acknowledge the current environment of the user is inside a building versus outside, i.e., by expressing "Once you step outside onto Fifth Avenue, turn left and walk towards Craig Street." This is in opposition to traditional guidance, wherein the original instruction to "Continue 200 meters to Craig Street" does not account for the change in circumstance, condition, environment or behavior of the user. Furthermore, the guidance platform 111 times conveyance of the message when it is most relevant to the user as opposed to continual repeating of the message as a distraction/annoyance during the time of purchase.

It is noted, therefore, that behavior patterns of the user may be used to trigger execution of guidance information at a UE 101a-101n. The behavior patterns may also correspond to context information for the user, the UE 101, or a combination thereof. Still further, in addition to ascertaining various behavioral patterns, the sensor information may also be used to determine the current line-of-sight of the user and/or UE 101. Based on the line-of-sight, corresponding line-of-sight information (e.g., a determined presence of one or more navigation elements within the line-of-sight) may be determined or predicted to occur at a certain time for coordinating the execution of guidance information.

As noted, the navigation elements may include various POIs and other objects that are within the user's line-of-sight during navigation. Line-of-sight information pertains to any set of data for indicating which navigation elements are within view of the user, characteristics of said navigation elements, or a combination thereof based on current location, position, orientation, etc., of the user and/or UE 101. This includes, for example, data regarding various buildings, landmarks, bridges, roadways, natural/organic objects such as trees and shrubs, throughways, street lights, fire hydrants, statues and other elements. Characteristics associated with the navigation elements may include, for example, color patterns, design elements, texture, dimension and/or depth parameters, location coordinates, spatial parameters, relative distances to other surrounding objects, and various other geometric and/or aesthetic qualities. In certain embodiments, the guidance platform 111 employs one or more three-dimensional models, reference tables, or a combination thereof to determine the above described line-of-sight information relative to the present location, position, orientation, tilt, etc., of the UE 101 or user.

In certain embodiments, the guidance platform 111 retrieves the sensor information provided by sensors 110 and determines the present location, orientation, tilt, or position of the user and/or UE 101 accordingly. The guidance platform 111 then uses this information—i.e., a relative location and position of the user and/or UE 101—as a point of reference for performing a lookup of a three-dimensional model and/or reference table corresponding to that location and/or position. The models and/or reference tables are maintained by the guidance platform 111 as one or more models 103.

Models 103 (three-dimensional or reference table/array) may be developed as a compilation of data regarding the above described navigation elements and/or characteristics thereof from various vantage points. For example, a pedestrian or ground-level vantage point may be used in reference to a determined tilt, orientation or location of the user and/or UE 101 from a ground level. Models 103 correlating to this vantage point are selected by the guidance platform 111 to accommodate pedestrian or vehicular travel. As another example, an aerial vantage point may be used in reference to a determined tilt, orientation or location of the user and/or UE 101 from an aerial level. Models 103 correlating to this vantage point are selected by the guidance platform 111 to accommodate aerial travel, views from a building or the like.

The guidance platform 111 may employ various processing algorithms and techniques for analyzing the models 103 relative to a determined line-of-sight. Likewise, the guidance platform 111 may readily extrapolate from the models 103 the various navigation elements corresponding to the determined line-of-sight. In addition, one or more models 103 representing various vantage points relative to a determined line-of-sight may be dynamically connected and/or correlated for accommodating continual changes in motion, position and orientation of the user and/or UE 101 (thus changes in line-of-sight). By way of this approach, the guidance platform 111 processes multiple models 103 continuously as the user navigates about a given environment corresponding to the one or more models 103.

In certain embodiments, the guidance platform 111 utilizes the models 103 and corresponding sensor information to determine and/or predict a time at which one or more navigation elements are to appear within the line-of-sight of the user and/or UE 101. By way of example, the platform 111 predicts the time based on the known speed, position, orientation and motion of the user and/or UE 101. In addition, a projected location point relative to the time may be ascertained, thus corresponding to line-of-sight information relative to that point. The guidance platform 111 then uses the projected time as a trigger for execution of guidance information. For example, it may be determined that a building named the Willis Tower is to appear within the line-of-sight of the user in three minutes based on the current speed and direction of travel of the user. Under this scenario, the guidance platform 111 initiates transmission of guidance information to the UE 101 for expressing the presence of the building (i.e., "Turn right at the Willis Tower.") corresponding to the line-of-sight.

It is noted that the primary camera of the UE 101 may be active for enabling the capture of image data depicting the various navigation elements, scenery and/or environment of the user as they travel. Hence, the image data may also be collected in association with tilt, orientation, motion, position, temporal and other sensor information for enabling the determining of line-of-sight information. In addition, a forward facing camera of the UE 101 may also be active for capturing an image of the user's face while the primary camera captures images of the various navigation elements within the environment. Under this scenario, the guidance platform 111 analyzes the image of the user's face to determine orientation of the user's head. As such, the guidance platform 111 may confirm that the line-of-sight of the user consistent with the line-of-sight of the UE 101—i.e., the direction of the face is in the same general direction as the primary camera.

In certain embodiments, the mapping application 107 and corresponding service 113 operate in conjunction with the UE 101a-101n to permit interactive viewing of the user environment via a display of the device 101a-101n. This viewing is performed concurrent with execution of the mapping application 107 or an augmented reality application. Under this scenario, the primary sensor/camera of UE 101a-101n is maintained in an active state. Resultantly, the various navigation elements encountered by the user during travel—i.e., within the line-of-sight—are presented to the display in real-time. Under this scenario, the guidance platform 111 coordinates the playback of guidance information during this viewing responsive to the elements within the line-of-sight.

In this mode of operation, the guidance platform 111 enables the rendering of visual highlights, icons, graphics and other features to be associated with the guidance information. By way of example, a verbal or visual instruction of "Turn right at Willis Tower" may be featured concurrent with a real-time captured image of the building. Under this scenario, the building may be presented in silhouette form, shaded, colored or otherwise highlighted for view by the user via the UE 101. The zoom level of various navigation elements, such as the building, may also be adapted accordingly. Additional information may also be displayed on the map, triggered for display in connection with the determined line-of-sight information, timing—i.e., only as required by the user.

Still further, the guidance platform 111 may also retrieve information from various other services 114 for enabling conveyance of guidance information. For example, the platform 111 may access weather, construction, local news or traffic reports for use in extrapolating various details regarding the environment corresponding to the user's current and/or predicted line-of-sight. Under this scenario, an instruction for indicating a stalled vehicle at a certain location corresponding to the user's line-of-sight may be conveyed as the following instruction: "Move over to the rightmost lane to avoid the stalled car in the left lane." In addition, one or more icons, graphics, texts or other items depicting the obstruction may be presented to the display. By way of example, a generic image of a car may be presented in lieu of an image of the actual stalled car. As another example, the leftmost lane corresponding to the obstruction may be highlighted or shaded a different color. As yet another example with respect to a weather condition, one or more weather related icons may be presented.

In future embodiments, it is contemplated that one or more mounted sensors may be used in connection with the guidance platform 111 for providing sensor information. This may include, for example, one or more sensors mounted on a pair of glasses for detecting tilt information, user perspective information, or other data for indicating the user's line-of-sight. In addition, ambient light data may be collected by the sensors for determining a general level of light or a visibility range of the user for perceiving one or more navigation elements.

Still further, a head mounted display (HMD) device featuring various sensors and optical display elements may be used to facilitate the gathering and presentment of data representing the user's line-of-sight. The guidance platform 111 may be configured to interact with the HMD to facilitate the presentment of relevant guidance information per the determined line-of-sight information. For example, an arrow, icon, sound, vibration or other signal may be triggered to occur or be rendered to a display element of the HMD for informing the user where to direct their gaze. Under this scenario, a vibration signal occurring on the left side of the glasses or HMD informs the user that they are to turn their head/direct their line-of-site towards the left.

The sensor information may also be used to determine whether one or more visibility conditions that affect the user or the navigation environment are fulfilled. For example, the user may generate a user profile 109 for indicating physical impairments, depth perception limitations, color blindness and visual acuity. In addition, the guidance platform 111 may also compensate for poor visibility factors that occur as a result of inclement weather or dark lighting conditions. Compensation may include adjusting a brightness level of the display, adjusting the contrast, enabling a night vision mode, zooming upon a navigation element, etc.

As shown in FIG. 1, the system 100 comprises a user equipment (UE) 101 having connectivity to the guidance platform 111 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, guidance platform 111, mapping service 113 and other services 114 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
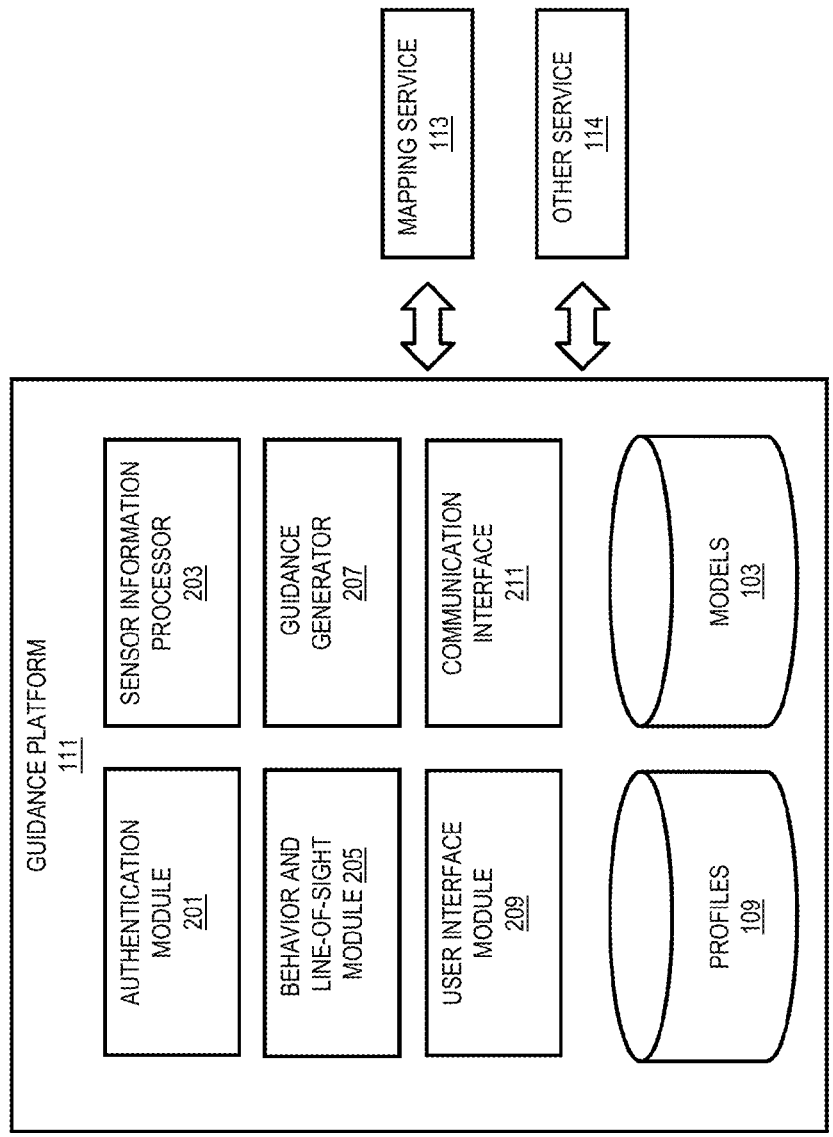
FIG. 2 is a diagram of the components of a guidance platform, according to one embodiment.
Figure 3A:
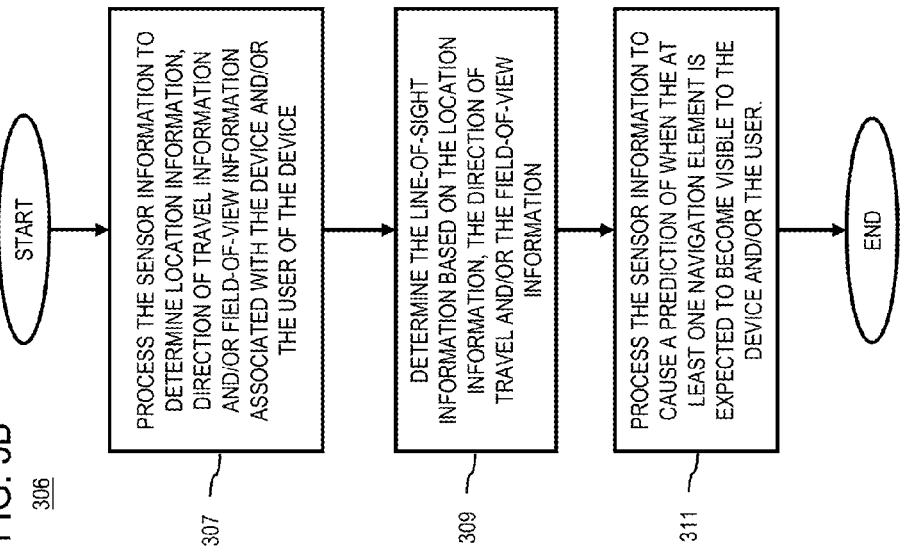
FIGS. 3A-3D are flowcharts of processes for triggering the conveyance of guidance information based on the current line-of-sight of the user, according to various embodiments.
Figure 3B:
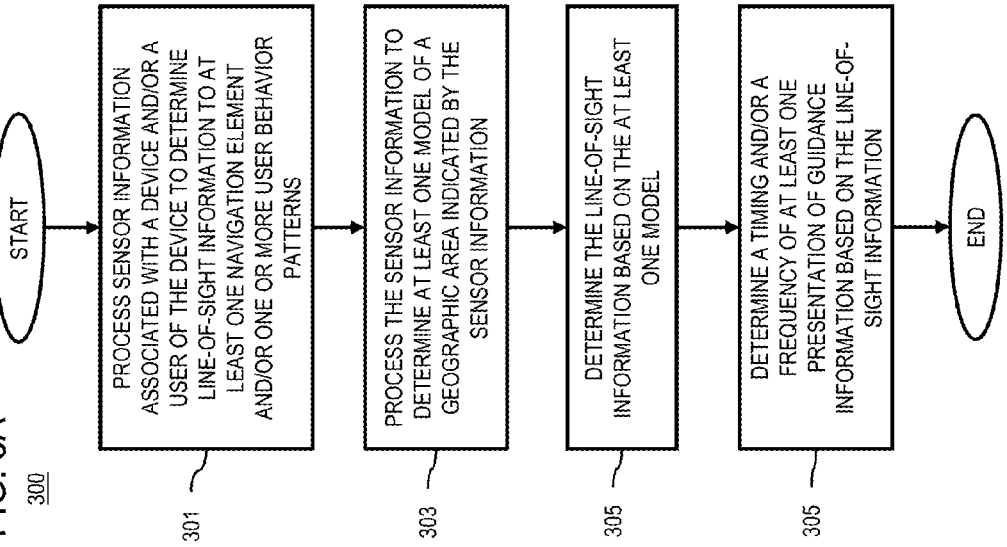
Figure 3D:
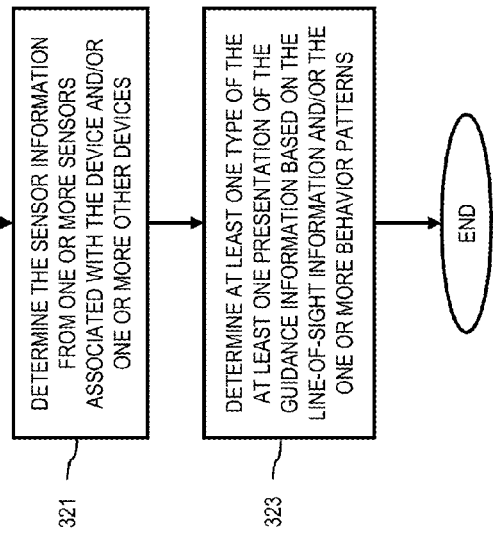
Figure 3C:
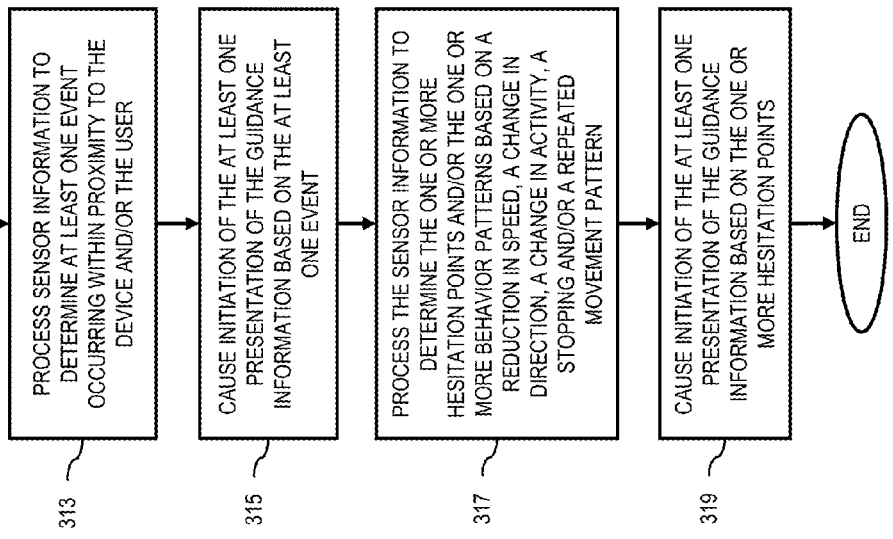

FIG. 2 is a diagram of the components of a guidance platform, according to one embodiment. By way of example, the guidance platform 111 includes one or more components for providing triggering the conveyance of guidance information based on the current line-of-sight of the user. It is contemplated that the functions of these components may be combined in one or more components or performed by other components of equivalent functionality. In this embodiment, the guidance platform includes an authentication module 201, sensor information processor 203, a behavior and line-of-sight module 205, a guidance generator 207, a user interface module 209 and a communication interface 211.

The aforementioned modules 201-211 of the guidance platform 111 may also access one or more databases 103 and 109 for performing various executions. This includes, for example, a models database 103 for maintaining one or more three-dimensional models and/or reference tables pertaining to one or more navigation elements. Also included is a profile database 109 for maintaining profile information related to one or more users subscribed to and/or associated with the guidance platform 111.

In one embodiment, an authentication module 201 authenticates users and user devices 101a-101n for interaction with the platform 111. By way of example, the authentication module 201 receives a request to subscribe to the guidance platform 111 for enabling the conveyance of relevant guidance information. The subscription process may include, for example, establishing one or more user visibility factors. Subscription may also entail selection of one or more guidance information preferences, including an activation of voice-based guidance, enabling of an augmented reality mode, or establishment of one or more services 113 and/or 114 to interact with. Preferences and settings information may be referenced to a specific user, user equipment, or combination thereof, and maintained as profile data.

The authentication process performed by the module 201 may also include receiving and validating a login name and/or user identification value as provided or established for a particular user during a subscription or registration process with the provider of the guidance platform 111. The login name and/or user identification value may be received as input provided by the user from the user device 101 or other device via a graphical user interface to the platform 111 (e.g., as enabled by user interface module 209). Registration data for respective subscribers, which contains pertinent user or device profile data, may be cross referenced as part of the login process. Alternatively, the login process may be performed through automated association of profile settings maintained as profile data 109 with an IP address, a carrier detection signal of a user device, mobile directory number (MDN), subscriber identity module (SIM) (e.g., of a SIM card), radio frequency identifier (RFID) tag or other identifier.

Still further, the authentication module 201 may also be configured to receive requests from UE 101a-101n to generate relevant guidance information. Having authenticated the UE 101, the authentication module 201 notifies the sensor information processor 203 of the request. In certain embodiments, the sensor information processor 203 receives sensor information as gathered by the sensors 110a-110n of respective UE 101a-101n. The processor 203 analyzes the data gathered by said sensors 110 to determine a relative speed, orientation, activity, location, number of start/stop (hesitation) occurrences, motion or environmental condition associated with the user and/or UE 101.

In one embodiment, the sensor information processor 203 operates in connection with the behavior and line-of-sight module 205 to facilitate the determining of a current line-of-sight, associated line-of-sight information, behavior, or a combination thereof of the user and/or UE 101. By way of example, the module 205 analyzes motion, location, tilt and positioning information to determine intermittent starting and stopping (hesitation) of the user. As another example, sound data and activity data may be analyzed to determine the user is lost or seeking directions of passersby. The determined behavior is then associated with a guidance priority for interpretation by the guidance generator 207. The priority determines a messaging template to be used for generation of the guidance information by the guidance generator 207.

It is noted that the messaging template corresponds to a data structure for generation of guidance information. In addition, the messaging template enables sequencing and/or prioritizing of the navigation elements to be included within the structure of the command, question or instruction. By way of example, when several navigation elements are (a) determined (e.g., predicted) to be within the user's line-of-sight at a given time and (b) are deemed relevant for conveyance of guidance, a conveyance sequence may be determined. The sequence may be based, at least in part, on the user's preferences, relevant three-dimensional model information and gathered sensor information (e.g., orientation of the head). Under this scenario, for example, a mailbox may be sequenced/prioritized for conveyance before a statue within the same line-of-sight per an instruction of "Proceed towards the mailbox across the street."

The sensor information may also be used to determine the current line-of-sight of the user and/or UE 101. Based on the line-of-sight, corresponding line-of-sight information (e.g., a determined presence of one or more navigation elements within the line-of-sight) may be determined or predicted to occur at a certain time for coordinating execution of guidance information by the guidance generator 207. By way of example, the behavior and line-of-sight module 205 uses various of the sensor information—i.e., a relative location and position of the user and/or UE 101—as a point of reference for performing a lookup of a model 103 corresponding to that location and/or position. The module 205 employs various analysis techniques and algorithms for analyzing the models based on the sensor information to extrapolate from the models 103 the various navigation elements corresponding to the determined line-of-sight.

Still further, the behavior and line-of-sight module 205 utilizes the models 103 and corresponding sensor information to determine and/or predict a time at which one or more navigation elements are to appear within the line-of-sight of the user and/or UE 101. By way of example, the module predicts the time based on the known speed, position, orientation and motion of the user and/or UE 101. In addition, a projected location point relative to the time may be ascertained, thus corresponding to line-of-sight information relative to that point. It is noted also that image data may be analyzed, such as in accordance with one or more image recognition techniques for interpreting objects within an image. The image data may be used to refine and/or confirm the accuracy of the line-of-sight.

In certain embodiments, the guidance generator 207 generates the guidance information in accordance with a determined guidance priority. In addition, the guidance generator 207 uses the projected/predicted time as a trigger for execution of guidance information. By way of example, the trigger corresponds to the occurrence of determined line-of-sight information or behavior patterns of the user. The guidance generator 207 operates in connection with the user interface module 209 and communication interface 211 to facilitate the rendering and/or conveyance of the guidance information to UE 101a-101n.

The guidance generator 207 composes the guidance using one or more instructional and/or command language templates that correlate with the guidance priority. By way of example, a low level priority may call for execution of general guidance information, including instructions and/or commands that are not based on navigation elements within the user's line-of-sight or pertinent to the determined user behavior. Alternatively, a high level priority may call for at least one navigation element to be mentioned in the guidance information. The guidance priority level may correspond to the number of navigation elements within the line-of-sight, the accuracy of the line-of-sight information, or a combination thereof. It is noted that the guidance generator 207 may employ one or more voice generation algorithms, language processors, or other systems for generating the guidance information.

The guidance generator 207 may also access a mapping service 113 or other service 114 such as a weather service, traffic surface or the like for generating guidance information. Alternatively, the guidance generator 207 may also be configured to retrieve rather than generate guidance information from various language generation sources.

In one embodiment the user interface module 209 enables presentment of a graphical user interface for [presenting the service offering]. By way of example, the user interface module 209 generates the interface in response to application programming interfaces (APIs) or other function calls corresponding to the browser application or web portal application of the user devices 101a-101n; thus enabling the display of graphics primitives. Of note, the user interface module 209 may operate in connection with the guidance generator 207 to enable initiation of the at least one presentation of guidance information.

In one embodiment, a communication interface 211 enables formation of a session over a network 105 between the guidance platform 111 and the mapping application, mapping service 113 or other services 114. By way of example, the communication interface 211 executes various protocols and data sharing techniques for enabling collaborative execution between a subscriber's user equipment 101a-101n (e.g., mobile devices, laptops, smartphones, tablet computers, desktop computers) and the guidance platform 111 over the network 105. It is noted that the communication interface 211 is also configured to support a browser session—i.e., the retrieval of content as referenced by a resource identifier during a specific period of time or usage of the browser. The browser session may support execution of a visual or audio-based guidance.

The above presented modules and components of the guidance platform 111 can be implemented in hardware, firmware, software, or a combination thereof. Though depicted as a separate entity in FIG. 1, it is contemplated that the guidance platform 111 may be implemented for direct operation by respective UEs 101a-101n. As such, the guidance platform 111 may generate direct signal inputs by way of the operating system of the UE for interacting with the application 107 and sensors 110, models 103, profiles 109, etc. In another embodiment, one or more of the modules 201-221 may be implemented for operation by respective UEs, as a platform 111, or combination thereof.

Figure 7:
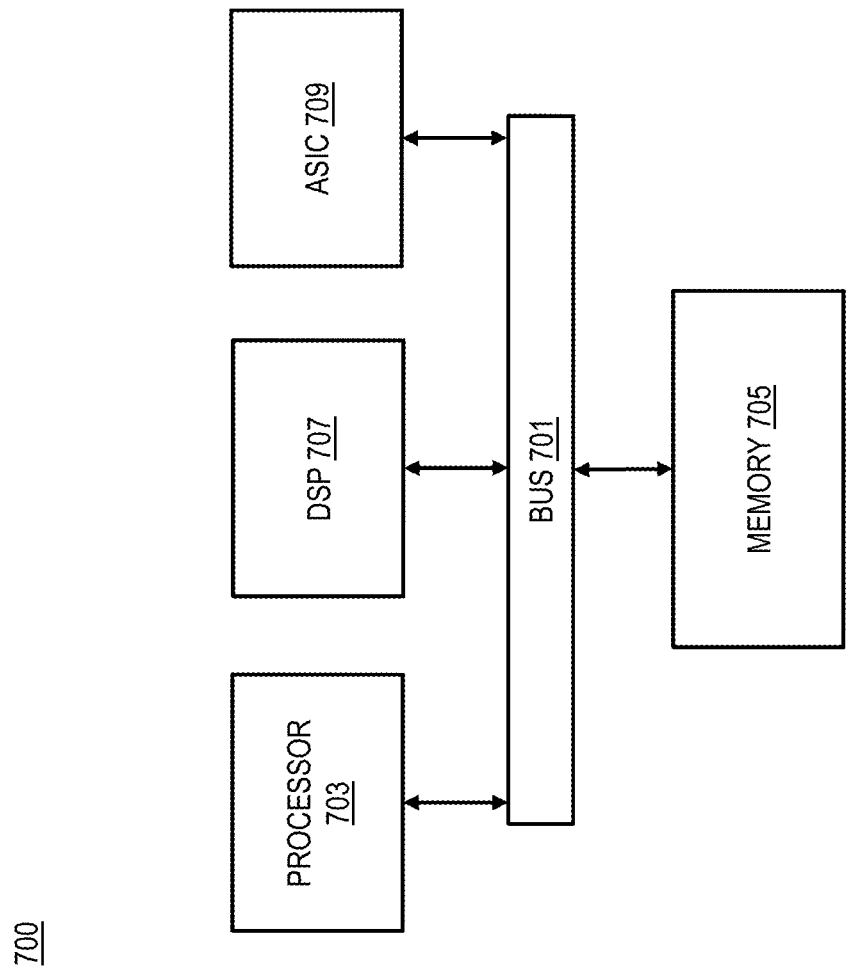
FIG. 7 is a diagram of a chip set that can be used to implement an embodiment of the invention.

FIGS. 3A-3D are flowcharts of processes for triggering the conveyance of guidance information based on the current line-of-sight of the user, according to various embodiments. In certain embodiments, the guidance platform 111 performs processes 300-320 and is implemented in, for instance, a chip set including a processor and a memory as shown in FIG. 7.

In step 301, the guidance platform 111 processes sensor information associated with a device and/or a user of the device to determine line-of-sight information to at least one navigation element and/or one or more user behavior patterns. As noted, the sensors may include a gyroscope, accelerometer, global positioning sensor, temporal sensor, motion sensor, audio recorder, temperature sensor, network detection sensor and the like. In step 303, the guidance platform 111 processes the sensor information to determine at least one model of a geographic area indicated by the sensor information. The model of the geographic area may be a three-dimensional representation, a reference table for specifying various characteristics of the geographic area, or a combination thereof.

Per step 305, the platform 111 determines the line-of-sight information based on the at least one model. In step 307, the guidance platform 111 determines a timing and/or a frequency of at least one presentation of guidance information based on the line-of-sight information. The presentation may be visual, such as to a display of requesting UE 101, verbal, such as to an audio/speaker system of requesting UE 101, or a combination thereof.

In step 307 of process 306 (FIG. 3B), the guidance platform 111 processes the sensor information to determine location information, direction of travel information and/or field-of-view information associated with the device and/or the user of the device. As noted previously, this information may be used as a point of reference for enabling the lookup of corresponding models 103 for line-of-sight information retrieval. In step 309, the platform 111 determines the line-of-sight information based on the location information, the direction of travel and/or the field-of-view information. Per step 311, the platform 111 processes the sensor information to cause a prediction of when the at least one navigation element is expected to become visible to the device and/or the user. It is noted that the line-of-sight information is based on the prediction. Furthermore, the prediction may correspond to the determined timing and/or frequency of the presentation of guidance information of step 305.

In step 313 of process 312 (FIG. 3C), the guidance platform 111 processes sensor information to determine at least one event occurring within proximity to the device and/or the user. By way of example, the event may include the occurrence of a particular navigation element within the line-of-sight of the user. Alternatively, the event may include a traffic related occurrence, social occurrence (e.g., parade), weather occurrence, etc. Still further, the event may correspond to the occurrence of a specific behavior pattern, such as a hesitation of the user. In another step 315, the platform 111 causes initiation of the at least one presentation of the guidance information based on the at least one event.

In step 317, the platform 111 processes the sensor information to determine the one or more hesitation points and/or the one or more behavior patterns based on a reduction in speed, a change in direction, a change in activity, a stopping and/or a repeated movement pattern. Per step 319, the platform 111 causes initiation of the at least one presentation of the guidance information based on the one or more hesitation points. It is noted that the hesitation, or frequency thereof, may be correlated by the platform 111 as indicating the user is lost. Also, a continue change in direction of the user or other movement may likewise indicate the user is lost.

In step 321 of process 320 (FIG. 3D), the platform 111 determines the sensor information from one or more sensors associated with the device and/or one or more other devices. By way of example, the guidance platform 111 may process sensor information as detected for different UE 101 configured for operation with the platform 111. In this way, additional data is made available to the guidance platform 111 for facilitating processing of line-of-sight information. Still further, the other device may include one or more user-mounted sensors, i.e., those mounted on a pair of glasses, a helmet, hat or head mounted device.

In another step 323, the platform 111 determines at least one type of the at least one presentation of the guidance information based on the line-of-sight information and/or the one or more behavior patterns. The at least one type includes, at least in part, an audio presentation, a visual presentation, a presentation of additional mapping or navigation elements, a highlighting of the at least one navigation element in a user interface, a change in the zoom level of the user interface, or a combination thereof.

As noted, the guidance platform 111 calculates a location and/or time at which a navigation element is to be within the line-of-sight. In this way, guidance information pertaining to this navigation element is triggered for playback only when said navigation element is within the line-of-sight. Resultantly, the guidance platform 111 enables UE 101a-101n to optimize the number of audio commands based on a user's behavior patterns. This ensures users are presented with relevant guidance information only when necessary, with limited annoyance or distraction of the user. This also optimizes battery use of the UE by limiting the occurrence of unnecessary audio commands.

Figure 4A:
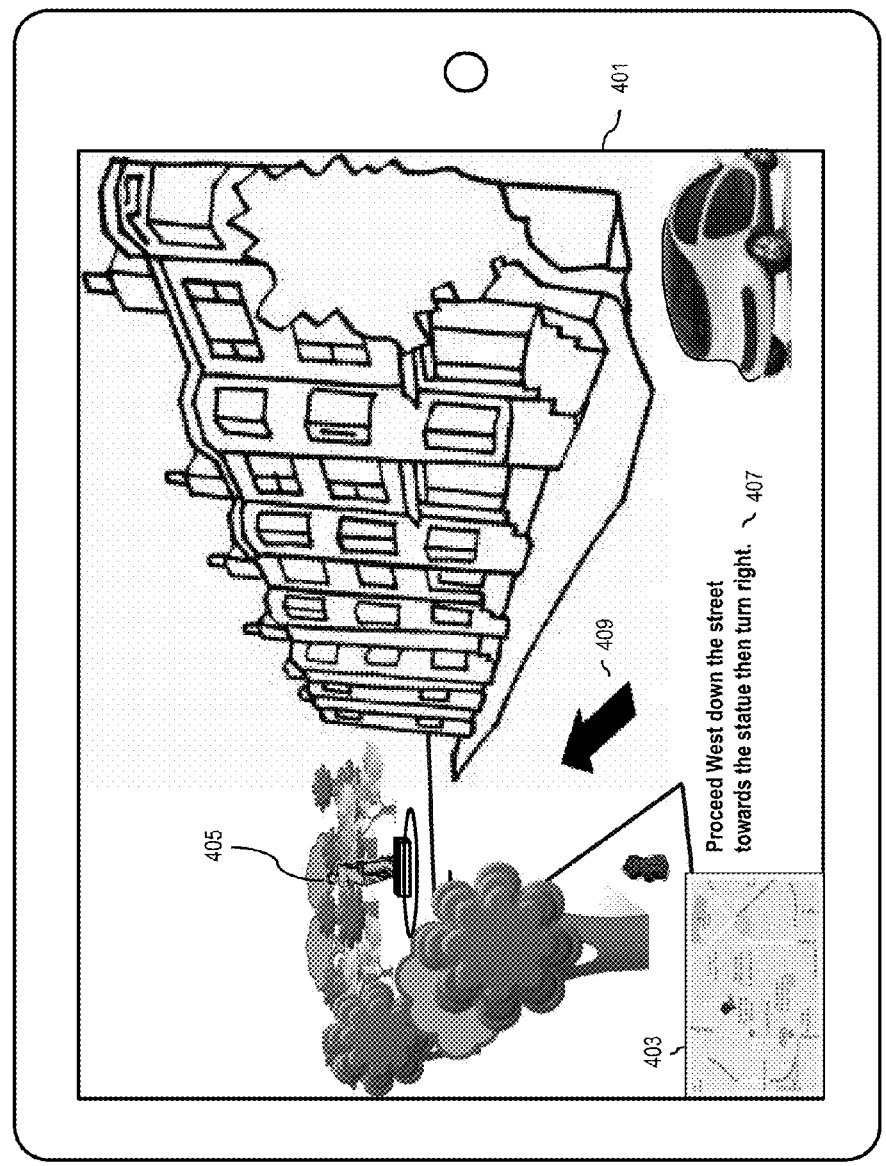
FIGS. 4A and 4B are diagrams of user interfaces utilized in the processes of FIGS. 3A-3D, according to various embodiments.
Figure 4B:
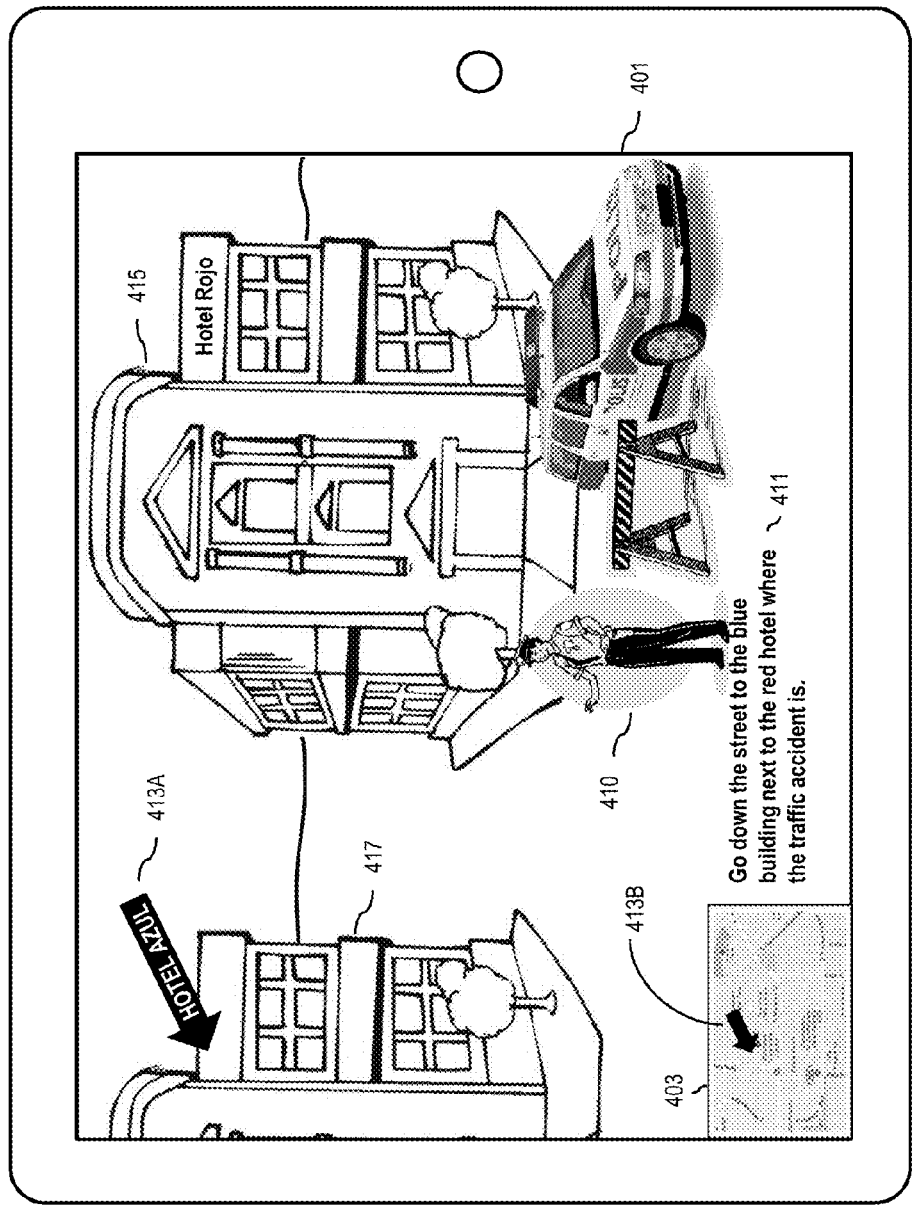

FIGS. 4A and 4B are diagrams of user interfaces utilized in the processes of FIGS. 3A-3D, according to various embodiments. For the purpose of illustration, the diagrams are described with respect to an exemplary use case of a user of a tablet device 400 navigating to a destination. The destination is entered into a mapping application, which is configured to present the routing information concurrent with a visual display of the user's environment. This may correspond to an augmented reality mode of operation, a street view mode of operation of the mapping application, or other interactive session.

In FIG. 4A, the display 401 of the table device 400 presents an inset map 403 corresponding to the determined routing information. The user may tap upon the inset map 403 to cause a rendering of an expanded view of the map. The user may also tilt the camera of the device in a direction corresponding to the route—i.e., point the camera in the direction of a street in which the user is instructed to proceed. Under this scenario, the display presents an image of a tree lined street featuring a statue 405 at the end of the street; wherein the scenery depicted in the image corresponds to the real-time environment of the user. In response, the guidance platform 111 analyzes the image data, location information, position information, orientation information, tilt information, etc., to determine corresponding line-of-sight information.

By way of example, the line-of-sight information includes at least one navigation element within the scenery, which includes the statue 403. Resultantly, the guidance platform 111 renders an instruction 407 that is based, at least in part, on the line-of-sight information. Under this scenario, the instruction is for the user to "Proceed West down the street towards the statue 405 then turn right." The instruction may also be rendered to a speaker system of the device for recitation to the user. Hence, it is noted that the guidance information expressly relates to the visible statue 405 that is within the line-of-sight of the user. It is further noted that the navigation element 405 as presented to the display 401 may be highlighted, shaded or associated with various icons for guiding the user—i.e., a direction marker 409.

This corresponds to an instance where the navigation element (statue 405) is within the line-of-sight of the user. In other instances, the navigation element may not be within the user's field-of-view due to limited lighting conditions or obstruction of the statue 405 by numerous trees. Obstruction of the known landmark, per analysis of one or more models corresponding to the location and/or position of the device 400, may be determined from evaluation of the image data. In the case where the navigation element is not visible, the guidance platform 111 causes rendering of different guidance information. By way of example, the guidance information may reference a navigation element that is visible from a nearby line-of-sight of the user, as in the following: "Proceed West, then go down the street to the building next to the hotel where the traffic accident is." Under this scenario, the guidance platform 111 makes reference to navigation elements that are not present in the user's current field-of-view. However, the guidance information 407 does reference one or more navigation elements the user may anticipate (view) once they proceed West and view right (towards the described building).

In FIG. 4B, once the user follows the instructions presented as guidance information 407, a view of the scenery is presented to the display 401 of the tablet 400. As a result, the guidance information 411 is adapted to account for the change in location, position, orientation, etc., of the user and corresponding change in scenery. The scenery includes various of the navigation elements corresponding to the instruction 407 and within the user's line-of-sight. This includes, for example, one or more icons 410 and/or real-time images of the traffic obstruction. Also rendered to the display in accordance with the instructions is a red hotel named Hotel Rojo 415. Next to this hotel is the blue building 417 named Hotel Azul 413.

In accordance with the labeling and/or highlighting features of the guidance platform 111, Hotel Azul 417 features a label 413a for prominently specifying the navigation element to the user. Also, of note, the inset map 403 is adapted to feature the same label 413b accordingly, thus indicating the corresponding location of the navigation element via the map 403. Alternatively, Hotel Azul 417 may be rendered to the display in a shaded or silhouette form for highlighting the navigation element. It is noted that the guidance platform 111 uses the models to determine the various characteristics of the navigation elements, including color information and relative position of the buildings. In addition, the guidance platform 111 may retrieve traffic reports or other information for determining the location and/or occurrence of the traffic obstruction conveyed as guidance information 411.

FIGS. 5A-5D are diagrams depicting a user device conveying guidance information based on the current line-of-sight of the user, according to various embodiments. For the purpose of illustration, the diagrams are described with respect to an exemplary use case of a user of a smartphone 500 navigating to a destination.

Figure 5A:
FIGS. 5A-5D are diagrams depicting a user device conveying guidance information based on the current line-of-sight of the user, according to various embodiments.
Figure 5B:
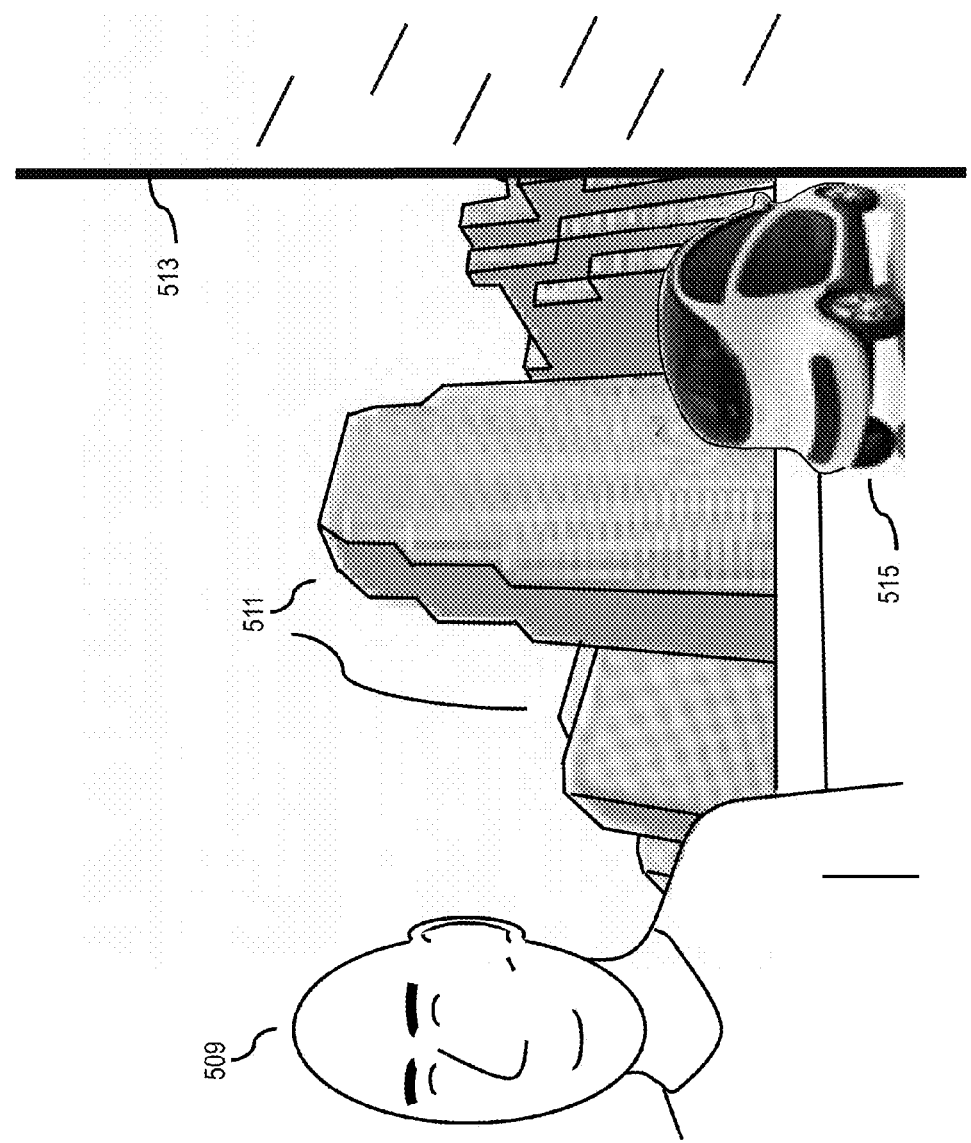

In FIG. 5A, the guidance platform 111 renders guidance information 505 and mapping information 503 to a display of the smartphone 500. The guidance information 505 corresponds to an instruction for the user to proceed towards an avenue named Mekail. By way of example, the guidance information 505 is conveyed visually or as an audio signal 507. As depicted in FIG. 5B, the guidance information 505 corresponds to the current line-of-sight of the user as they approach the avenue. Under this scenario, the user's field-of-view includes a pedestrian 509, one or more buildings 511 and a passing vehicle 515 traveling along Mekail Avenue. A wall 513 obstructs the user's view, thus preventing viewing of the building corresponding to the destination location. It is noted, in this example, that the building is not yet within the line-of-sight of the smartphone 500 based on the current location and/or position of the user.

Figure 5C:
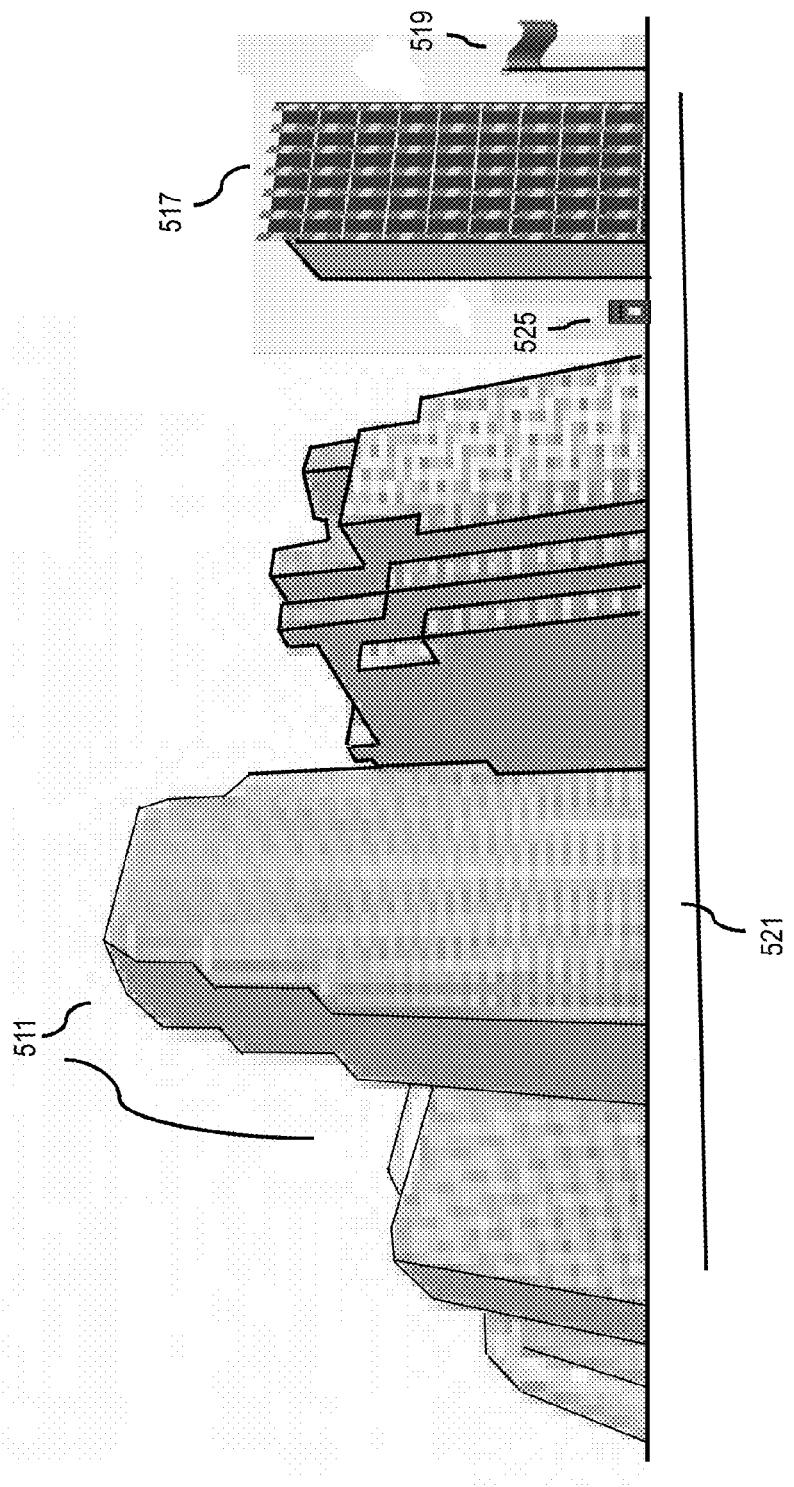
Figure 5D:

In FIG. 5C, when the user walks beyond the wall 513 (e.g., around the corner), the field-of-view of the user expands to include the building 517 corresponding to the destination location. The guidance platform 111 collects updated location and/or position information for the smartphone 500 to determine that the building 517 is now within the line-of-sight of the smartphone 500. As a result, the guidance information 523 is adapted to incorporate language for conveying various navigation elements within the line-of-sight, as shown in FIG. 5D. This includes, for example, a reference to the street 521 (Mekail Street) the user is to cross and the flagpole 519 outside the building 517.

Of note, the guidance information 523 is not caused to be rendered to the display 501 of the smartphone 500 until the user's field-of-view depicted in FIG. 5C corresponds to the line-of-sight information determined with respect to the smartphone 500. Under this scenario, the guidance platform 111 can predict the time of encounter of the building 517 based on location position and speed information determined prior to the user advancing beyond the wall 513. As a result, the adapted guidance information 523 may be triggered to be rendered corresponding to this predetermined time.

Still further, the guidance platform 111 triggers execution of guidance information in response to an event occurrence corresponding to the line-of-sight of the user. By way of example, the user may configure in their profile a reminder to inform them when a mailbox 525 is visible nearby. Under this scenario, a "Mailbox present" message is rendered to the user per the guidance information 523.

The processes described herein for triggering the conveyance of guidance information based on the current line-of-sight of the user may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
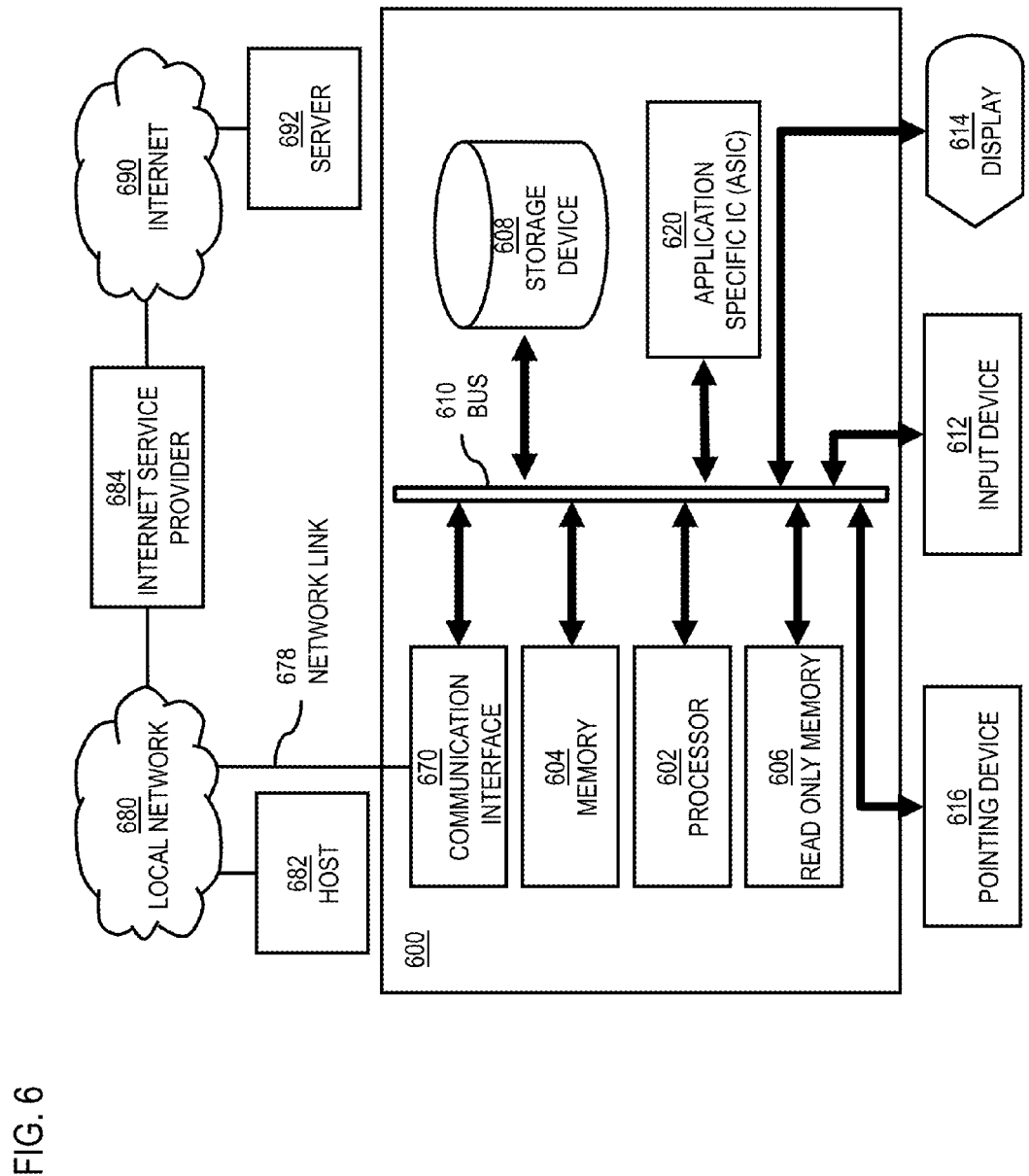
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to trigger the conveyance of guidance information based on the current line-of-sight of the user as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of triggering the conveyance of guidance information based on the current line-of-sight of the user.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to trigger the conveyance of guidance information based on the current line-of-sight of the user. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for triggering the conveyance of guidance information based on the current line-of-sight of the user. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for triggering the conveyance of guidance information based on the current line-of-sight of the user, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for triggering the conveyance of guidance information based on the current line-of-sight of the user to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to trigger the conveyance of guidance information based on the current line-of-sight of the user as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of triggering the conveyance of guidance information based on the current line-of-sight of the user.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to trigger the conveyance of guidance information based on the current line-of-sight of the user. The memory 705 also stores the data associated with or generated by the execution of the inventive steps.

Figure 8:
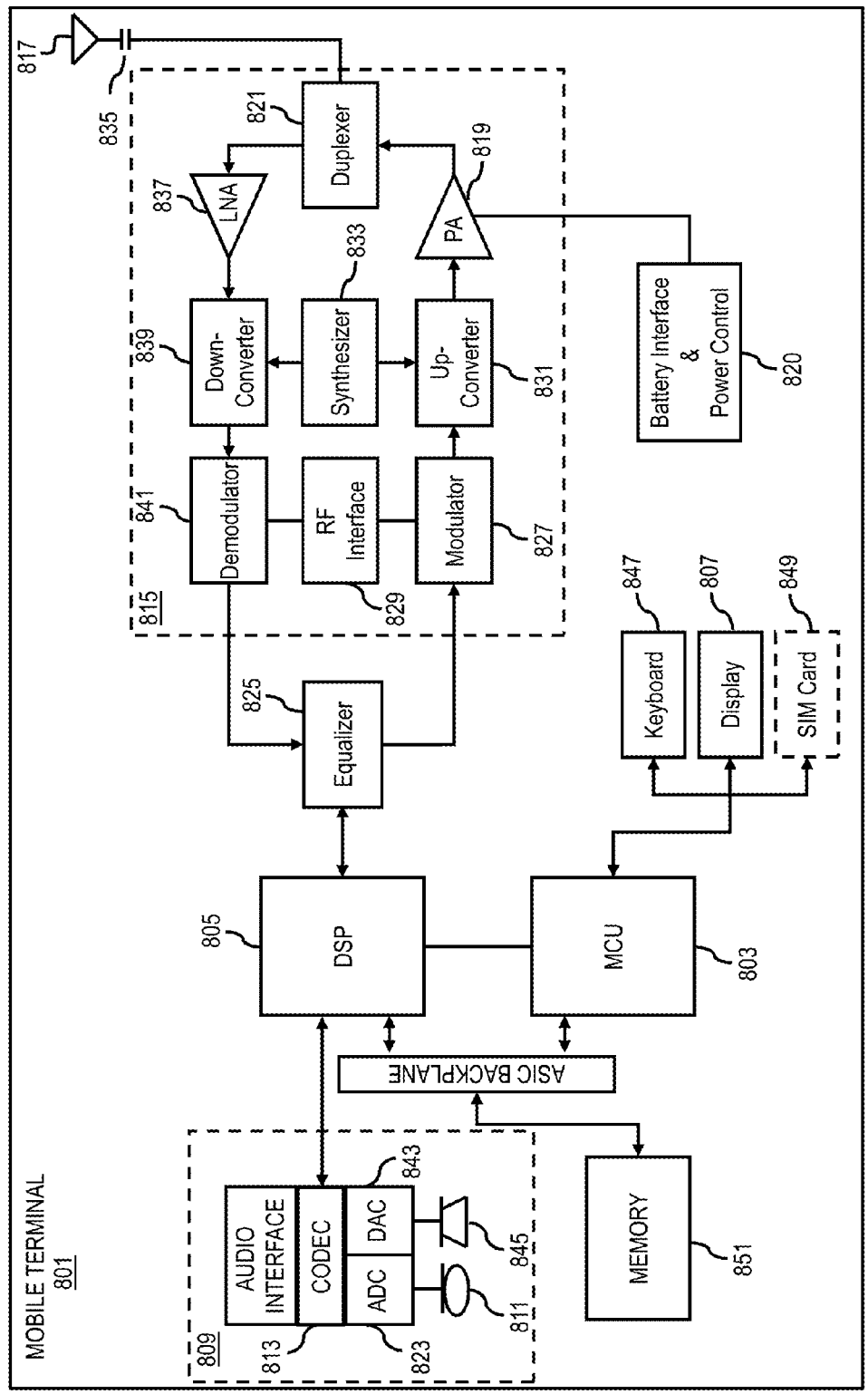
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of triggering the conveyance of guidance information based on the current line-of-sight of the user.

Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of triggering the conveyance of guidance information based on the current line-of-sight of the user. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to trigger the conveyance of guidance information based on the current line-of-sight of the user. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing, via a processor, sensor information associated with a device, a user of the device, or a combination thereof to determine line-of-sight information to at least one navigation element and one or more user behavior patterns, wherein the one or more behavior patterns include, at least in part, one or more hesitation points;
   determining, via the processor, a timing, a frequency, or a combination thereof of at least one presentation of guidance information based, at least in part, on the line-of-sight information; and
   initiating the at least one presentation of the guidance information based, at least in part, on the one or more hesitation points,
   wherein the hesitation points are determined based on a number of start/stop occurrences within a period of time to indicate the user is lost.

2. A method of claim 1, further comprising:
   processing the sensor information to determine at least one model of a geographic area indicated by the sensor information; and
   determining the line-of-sight information based, at least in part, on the at least one model.

3. A method of claim 1, further comprising:
   processing the sensor information to determine location information, direction of travel information, field-of-view information, or a combination thereof associated with the device, the user of the device, or a combination thereof; and
   determining the line-of-sight information based, at least in part, on the location information, the direction of travel, the field-of-view information, or a combination thereof.

4. A method of claim 1, further comprising:
   processing the sensor information to cause, at least in part, a prediction of when the at least one navigation element is expected to become visible to the device, the user, or a combination thereof,
   wherein the line-of-sight information is based, at least in part, on the prediction.

5. A method of claim 1, further comprising:
   processing the sensor information to determine at least one event occurring within proximity to the device, the user, or a combination thereof, wherein the at least one navigation element is based, at least in part, on the at least one event; and
   initiating the at least one presentation of the guidance information based, at least in part, on the at least one event.

6. A method of claim 1, wherein the line-of-sight information is further based, at least in part, on one or more characteristics of the device, the user, the at least one navigation element, an environment in which the device is operating, or a combination thereof.

7. A method of claim 1, further comprising:
   processing the sensor information to determine the one or more hesitation points, the one or more behavior patterns, or a combination thereof based, at least in part, on a reduction in speed, a change in direction, a change in activity, a stopping, a repeated movement pattern, or a combination thereof.

8. A method of claim 1, further comprising:
   determining the sensor information from one or more sensors associated with the device, one or more other devices, or a combination thereof,
   wherein the one or more other devices include, at least in part, one or more user-mounted sensors.

9. A method of claim 1, further comprising:
   determining at least one type of the at least one presentation of the guidance information based, at least in part, on the line-of-sight information, the one or more behavior patterns, or a combination thereof,
   wherein the at least one type includes, at least in part, an audio presentation, a visual presentation, a presentation of additional mapping or navigation element, a highlighting of the at least one navigation element in a user interface, a change in the zoom level of the user interface, or a combination thereof.

10. An apparatus comprising:
    at least one processor; and
    at least one memory including computer program code for one or more programs,
    the at least one memory and the computer program code configured to, with the at least one processor, cause the apparatus to perform at least the following,
       process sensor information associated with a device, a user of the device, or a combination thereof to determine line-of-sight information to at least one navigation element and one or more user behavior patterns, wherein the one or more behavior patterns include, at least in part, one or more hesitation points;
       determine a timing, a frequency, or a combination thereof of at least one presentation of guidance information based, at least in part, on the line-of-sight information; and
       cause an initiation of the at least one presentation of the guidance information based, at least in part, on the one or more hesitation points,
          wherein the hesitation points are determined based on a number of start/stop occurrences within a period of time to indicate the user is lost.

11. An apparatus of claim 10, wherein the apparatus is further caused to:
    process the sensor information to determine at least one model of a geographic area indicated by the sensor information; and
    determine the line-of-sight information based, at least in part, on the at least one model.

12. An apparatus of claim 10, wherein the apparatus is further caused to:
- process the sensor information to determine location information, direction of travel information, field-of-view information, or a combination thereof associated with the device, the user of the device, or a combination thereof; and
- determine the line-of-sight information based, at least in part, on the location information, the direction of travel, the field-of-view information, or a combination thereof.

13. An apparatus of claim 10, wherein the apparatus is further caused to:
- process the sensor information to cause, at least in part, a prediction of when the at least one navigation element is expected to become visible to the device, the user, or a combination thereof,
- wherein the line-of-sight information is based, at least in part, on the prediction.

14. An apparatus of claim 10, wherein the apparatus is further caused to:
- process the sensor information to determine at least one event occurring within proximity to the device, the user, or a combination thereof, wherein the at least one navigation element is based, at least in part, on the at least one event; and
- cause, at least in part, an initiation of the at least one presentation of the guidance information based, at least in part, on the at least one event.

15. An apparatus of claim 10, wherein the line-of-sight information is further based, at least in part, on one or more characteristics of the device, the user, the at least one navigation element, an environment in which the device is operating, or a combination thereof.

16. An apparatus of claim 10, wherein the apparatus is further caused to:
- process the sensor information to determine the one or more hesitation points, the one or more behavior patterns, or a combination thereof based, at least in part, on a reduction in speed, a change in direction, a change in activity, a stopping, a repeated movement pattern, or a combination thereof.

17. An apparatus of claim 10, wherein the apparatus is further caused to:
- determine the sensor information from one or more sensors associated with the device, one or more other devices, or a combination thereof,
- wherein the one or more other devices include, at least in part, one or more user-mounted sensors.

18. An apparatus of claim 10, wherein the apparatus is further caused to:
- determine at least one type of the at least one presentation of the guidance information based, at least in part, on the line-of-sight information, the one or more behavior patterns, or a combination thereof,
- wherein the at least one type includes, at least in part, an audio presentation, a visual presentation, a presentation of additional mapping or navigation element, a highlighting of the at least one navigation element in a user interface, a change in the zoom level of the user interface, or a combination thereof.

* * * * *